United States Patent
Kawakami (10) Patent No.: US 6,325,047 B2
(45) Date of Patent: Dec. 4, 2001

(54) CONTROL APPARATUS FOR INTERNAL COMBUSTION ENGINE

(75) Inventor: Takeshi Kawakami, Hyogo-ken (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/852,650

(22) Filed: May 11, 2001

Related U.S. Application Data (62) Division of application No. 09/505,772, filed on Feb. 17, 2000.

(30) Foreign Application Priority Data

Sep. 6, 1999 (JP) .................................................. 11-251629

(51) Int. Cl.⁷ ............................... F02P 5/15; F02D 13/02
(52) U.S. Cl. ................................ 123/406.64; 123/406.12
(58) Field of Search ......................... 123/90.15–90.18, 123/406.12, 406.2, 406.47, 406.64, 478, 480, 486; 701/102

(56) References Cited

U.S. PATENT DOCUMENTS

| | | | |
|---|---|---|---|
| 5,163,403 | * 11/1992 | Kitagawa et al. | 123/406.45 |
| 5,590,632 | * 1/1997 | Kato et al. | 123/480 |
| 5,850,815 | * 12/1998 | Yano et al. | 123/406.47 |
| 6,035,826 | * 3/2000 | Matsuoka | 123/406.62 |
| 6,058,906 | * 5/2000 | Yoshino | 123/406.47 X |
| 6,085,729 | * 7/2000 | Kondo et al. | 123/478 |
| 6,182,636 | * 2/2001 | Russell et al. | 123/478 X |

FOREIGN PATENT DOCUMENTS

| | | |
|---|---|---|
| 59-119066 | 7/1984 | (JP) . |
| 1-80734 | 3/1989 | (JP) . |
| 9-287496 | 11/1997 | (JP) . |

* cited by examiner

Primary Examiner—Tony M. Argenbright
(74) Attorney, Agent, or Firm—Sughrue, Mion, Zinn, Macpeak & Seas, PLLC

(57) ABSTRACT

To exactly obtain a volumetric efficiency or ignition timing corresponding to a shift amount in rotational angle or phase of a camshaft relative to a crank shaft operably connected therewith even if the opening/closing timing of an exhaust valve and an intake valve is changed so as to optimally control an fuel injection amount or ignition timing, the fuel injection amount or the ignition timing is controlled by calculating a fuel control parameter or an ignition timing control parameter on the basis of an intake pressure and a rpm of the engine. When the valve timing is changed, the amount of change in the valve timing is detected so that the fuel control parameter or the ignition timing control parameter is compensated for on the basis of the change amount thus detected.

3 Claims, 8 Drawing Sheets

INTAKE PASSAGE PRESSURE Pb [mmHg]

|   | $P_1$ | $P_2$ |  | $P_j$ |  | $P_n$ |
|---|---|---|---|---|---|---|
| $N_1$ | $EV_{11}$ | $EV_{12}$ |  | $EV_{1j}$ |  | $EV_{1n}$ |
| $N_2$ | $EV_{21}$ | $EV_{22}$ |  | $EV_{2j}$ |  | $EV_{2n}$ |
| ⋮ |  |  |  |  |  |  |
| $N_i$ | $EV_{i1}$ | $EV_{i2}$ |  | $EV_{ij}$ |  | $EV_{in}$ |
| ⋮ |  |  |  |  |  |  |
| $N_m$ | $EV_{m1}$ | $EV_{m2}$ |  | $EV_{mj}$ |  | $EV_{mn}$ |

ENGINE [rpm]

VOLUMETRIC EFFICIENCY

INTAKE PASSAGE PRESSURE Pb [mmHg]

| | $P_1$ | $P_2$ | | $P_j$ | | $P_n$ |
|---|---|---|---|---|---|---|
| $N_1$ | $T_{11}$ | $T_{12}$ | | $T_{1j}$ | | $T_{1n}$ |
| $N_2$ | $T_{21}$ | $T_{22}$ | | $T_{2j}$ | | $T_{2n}$ |
| ⋮ | | | | | | |
| $N_i$ | $T_{i1}$ | $T_{i2}$ | | $T_{ij}$ | | $T_{in}$ |
| ⋮ | | | | | | |
| $N_m$ | $T_{m1}$ | $T_{m2}$ | | $T_{mj}$ | | $T_{mn}$ |

ENGINE [rpm]

IGNITION TIMING

FIG. 8

IGNITION TIMING MAP FOR VALVE TIMING VT₃

| | $P_1$ | $P_2$ | ... | $P_j$ | ... | $P_n$ |
|---|---|---|---|---|---|---|
| $N_1$ | $T_{11}$ | $T_{12}$ | | $T_{1j}$ | | $T_{1n}$ |
| $N_2$ | $T_{21}$ | $T_{22}$ | | $T_{2j}$ | | $T_{2n}$ |
| ... | | | | | | |
| $N_i$ | $T_{i1}$ | $T_{i2}$ | | $T_{ij}$ | | $T_{in}$ |
| ... | | | | | | |
| $N_m$ | $T_{m1}$ | $T_{m2}$ | | $T_{mj}$ | | $T_{mn}$ |

IGNITION TIMING MAP FOR VALVE TIMING VT₂

IGNITION TIMING MAP FOR VALVE TIMING VT₁

FIG. 9

CONTROL APPARATUS FOR INTERNAL COMBUSTION ENGINE

This is a Divisional of application Ser. No. 09/505,772 filed Feb. 17, 2000, the disclosure of which is incorporated herein by reference.

BACKGROUND OF THE INVENTION

1. Field of the Invention

The present invention relates to a control apparatus for an internal combustion engine, provided with a variable valve timing mechanism (VVT) for variably controlling an opening/closing timing (valve timing) of an intake valve and an exhaust valve of the internal combustion engine in response to an operating condition of the engine, and more particularly to a control apparatus for an internal combustion engine for controlling a fuel injection amount or an ignition timing in response to a change in the valve timing.

2. Description of the Related Art

Conventionally, in a D-jetro type control apparatus for an internal combustion engine, a fuel injection amount or an ignition timing has been controlled by using a volumetric efficiency or ignition timing which has been obtained from the number of revolutions per minute (rpm) of the engine or an intake pressure. Thus, in the D-jetro system, the volumetric efficiency or the ignition timing is obtained by using the rpm of the engine and the intake pressure as parameters. The volumetric efficiency and the ignition timing are obtained at a plurality of points from a plurality of the rpms of the engines and intake pressures to thereby prepare a map, and values other than the values obtained in advance with respect to the volumetric efficiency and the ignition timing are obtained from the map by way of interpolation.

Such a method for obtaining the volumetric efficiency is effective in the case where the opening/closing timing of the exhaust/intake valve is kept constant. However, in the internal combustion engine provided with the VVT for variably and continuously controlling the valve timing, even if the rpm of the engine or the intake pressure is kept constant, a change in the opening/closing timing of the exhaust/intake valves causes a change in the volumetric efficiency or the optimum ignition timing. Then, the change in the volumetric efficiency and/or the ignition timing relative to the change of such valve timing is not constant depending upon the rpm of the engine or the intake pressure.

Accordingly, in the internal combustion engine provided with the VVT, in the case where the opening/closing timing of the exhaust/intake valve is changed, there arises a problem in that the fuel injection amount or the target ignition timing may be shifted from the optimum value.

SUMMARY OF THE INVENTION

Accordingly, the present invention is intended to overcome the above-noted problem inherent in the prior art, and has for its object to provide a control apparatus for a D-jetro type internal combustion engine having a VVT mechanism, which is capable of preparing a plurality of maps of control quantities such as a volumetric efficiency, an ignition timing and the like in accordance with a shift amount of opening/closing timing of an intake valve and/or an exhaust valve, interpolating the values between the maps on the basis of an actual shift amount of the actual valve timing and exactly obtaining the volumetric efficiency or the ignition timing corresponding to the shift amount even if the opening/closing timing of the intake valve and/or the exhaust valve is changed, whereby the fuel injection amount and the ignition timing may be optimally controlled.

Another object of the present invention is to provide a control apparatus for an internal combustion engine in which the amount of data to be stored in a memory may be reduced as much as possible when the volumetric efficiency or the ignition timing is to be obtained in response to the shift amount of the opening/closing timing of the intake valve and/or the exhaust valve.

Bearing the above objects in mind, according to a first aspect of the present invention, there is provided a control apparatus for an internal combustion engine for variably controlling an opening/closing timing of an intake valve and an exhaust valve of the internal combustion engine in response to an engine operating condition. The apparatus comprises: a memory for storing a fuel control parameter as a plurality of data preset on the basis of an intake pressure and an rpm of the internal combustion engine; a valve opening/closing element provided on a camshaft which is operably connected with a crank shaft of the internal combustion engine for drivingly opening/closing the intake valve and the exhaust valve in synchronism with a rotation of the crank shaft; a rotational phase controller for shifting a rotational phase of the camshaft relative to the crank shaft; a shift amount detector for detecting a shift amount of the rotational phase of the camshaft relative to the crank shaft caused by the rotation shift controller; a compensator for calculating control data on the basis of the intake pressure and the rpm of the engine and the plurality of data of the fuel control parameter stored in the memory and for compensating the calculated data on the basis of the detection value of the shift amount detector; and a fuel injection amount controller for controlling a fuel injection amount to each cylinder of the internal combustion engine in accordance with data in which the fuel control parameter has been compensated for. The fuel control parameter has a change-rate change maximum point at which a change in a change rate of the fuel control parameter relative to the shift amount he cam shaft is at maximum, and the data of the fuel control parameter is determined in advance for each shift amount substantially corresponding to the change-rate change maximum point.

In a preferred form of the first aspect of the invention, values of the fuel control parameter other than the stored data are obtained through an interpolation calculation in response to a detection value of the shift amount detector from the stored fuel control parameter corresponding to the shift amount close to the detection value.

In another preferred form of the first aspect of the invention, the control apparatus further comprises an overlap amount calculator for calculating an overlap amount of the intake valve and the exhaust valve on the basis of the detection value of the shift amount detector. The fuel control parameter is a value that is smaller at least in a region where the overlap amount is greater than a predetermined value than that in the other regions thereof.

According to a second aspect of the present invention, there is provided a control apparatus for an internal combustion engine for variably controlling an opening/closing timing of an intake valve and an exhaust valve of the internal combustion engine in response to an engine operating condition. The apparatus comprises: a memory for storing an ignition timing control parameter as a plurality of data preset on the basis of an intake pressure and an rpm of the internal combustion engine; a valve opening/closing element provided on a camshaft which is operably connected with a crank shaft of the internal combustion engine for drivingly opening/closing the intake valve and the exhaust valve in synchronism with a rotation of the crank shaft; a rotational phase controller for shifting a rotational phase of the camshaft relative to the crank shaft; a shift amount detector for detecting a shift amount of the rotational phase of the camshaft relative to the crank shaft caused by the rotation shift controller; a compensator for calculating control data on the basis of the intake pressure, the rpm of the engine and the plurality of data of the ignition timing control parameter stored in the memory and for compensating the calculated data on the basis of the detection value of the shift amount detector; and an ignition timing controller for controlling an ignition timing for each cylinder of the internal combustion engine in accordance with data in which the ignition timing control parameter has been compensated for. The ignition timing control parameter has a change-rate change maximum point at which a change in a change rate of the ignition control parameter relative to the shift amount of the camshaft is at maximum, and the data of the ignition timing control parameter is determined in advance for each shift amount substantially corresponding to the change-rate change maximum point.

In a preferred form of the second aspect of the invention, values of the ignition timing control parameter other than the stored data are obtained through an interpolation calculation in response to a detection value of the shift amount detector from the stored ignition timing control parameter corresponding to the shift amount close to the detection value.

In another preferred form of the second aspect of the invention, the control apparatus further comprises an overlap amount calculator for calculating an overlap amount of the intake valve and the exhaust valve on the basis of the detection value of the shift amount detector. The ignition timing control parameter is a value that advances the ignition timing at least in a region where the overlap amount is greater than a predetermined value than that in the other regions thereof.

The above and other objects, features and advantages of the present invention will become readily apparent to those skilled in the art from the following detailed description of presently preferred embodiments of the invention taken in conjunction with the accompanying drawings.

DESCRIPTION OF THE PREFERRED EMBODIMENTS

Now, preferred embodiments of the present invention will be described below with reference to the accompanying drawings.

Embodiment 1

Figure 1:
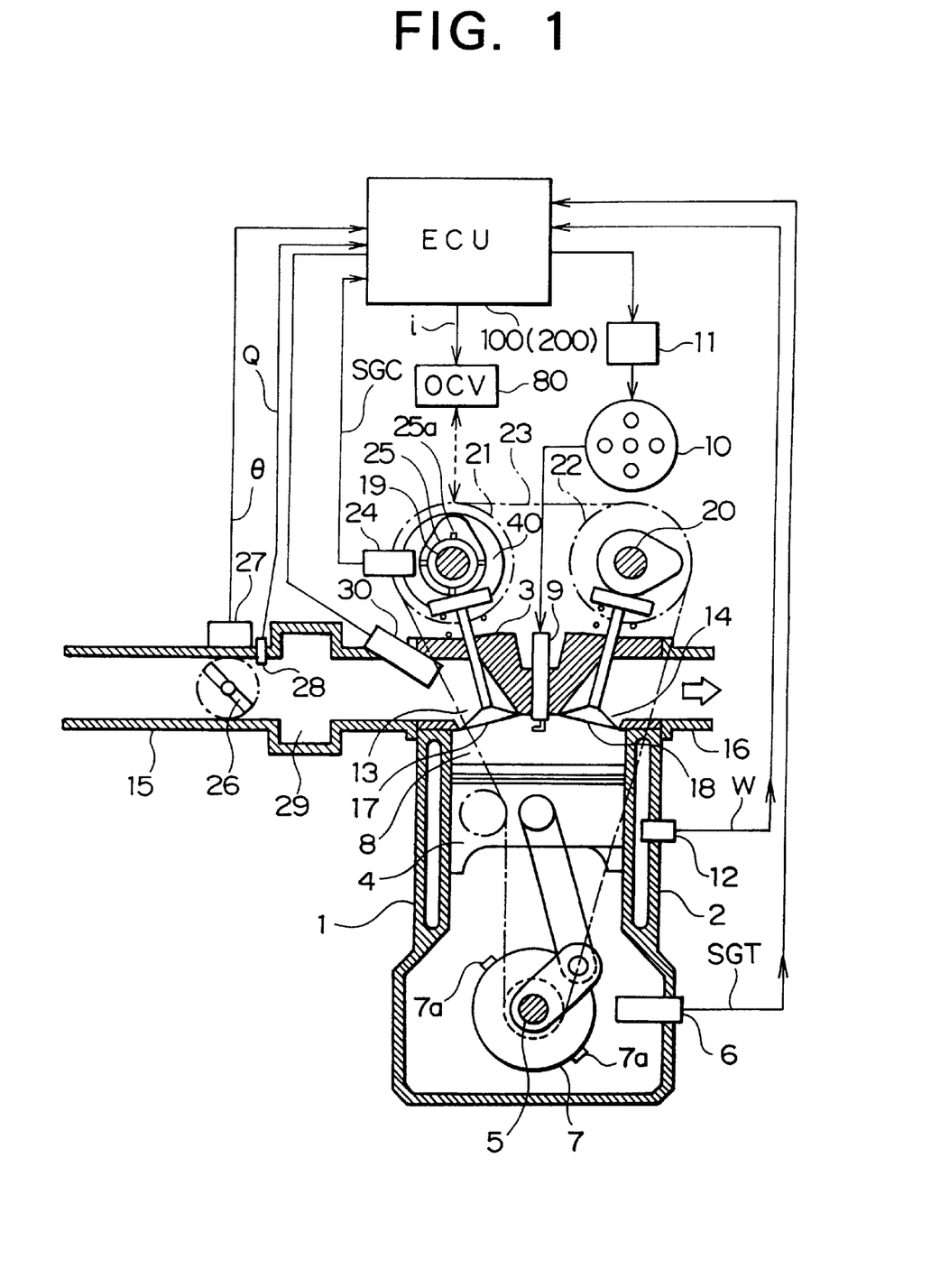
FIG. 1 is a cross-sectional view showing a schematic structure of an internal combustion engine to which a control apparatus for an internal combustion engine according to the present invention is applied.

FIG. 1 schematically shows in cross section the structure of an internal combustion engine having a general variable valve timing mechanism, to which the present invention is applied.

In FIG. 1, an internal combustion engine 1 includes a plurality (for example, four) of cylinders which form an engine proper. Herein is shown only one of the cylinders of the engine 1.

A cylinder block 2 defined therein the cylinders of the engine 1. A cylinder head 3 is connected to the top of the cylinder block 2. A piston 4 is received in each cylinder of the cylinder block 2 so as to be moved for reciprocation. A crankshaft 5 is connected to an end portion of the piston 4 and is rotated in accordance with the reciprocating movements of the piston 4.

A crank angle sensor 6 in the from of an electromagnetic pickup is disposed in the vicinity of, for example, the crankshaft 5 and outputs a crank angle signal SGT in synchronism with the rotation of the engine 1. The crank angle signal SGT is used to detect the number of revolutions per minute (rpm) Ne of the engine 1 as well as a predetermined position of the crankshaft 5, i.e., a predetermined reference crank angle (°CA) thereof.

A signal rotor 7 is connected integrally with the crankshaft 5, and has two teeth 7a of magnetic material formed at every rotational angle of 180°. The crank angle sensor 6 generates a pulse-like crank angle signal SGT every time each tooth 7a passes a front portion of the crank angle sensor 6.

Defined by an inner wall of each cylinder, the cylinder head 3 and a top portion of each piston 4 is a combustion chamber 8 in which an air fuel mixture sucked into the engine 1 is burnt. An ignition plug 9 is disposed at the top of the cylinder head 3 so as to project into the combustion chamber 8 for igniting the mixture through electric discharge.

A distributor 10 is disposed to be connected with an exhaust side camshaft 20 (to be described later) of the cylinder head 3 and sequentially applies a high voltage for ignition to the ignition plug 9 of each cylinder. An igniter 11 generates the high voltage for ignition.

Each ignition plug 9 is connected to the distributor 10 through a high tension cord (not shown), and the high voltage outputted from the igniter 11 is distributed through the distributor 10 to each ignition plug 9 in synchronism with the rotation of the crank shaft 5.

A water temperature sensor 12 is disposed on the cylinder block 2 for detecting a temperature (cooling water temperature) W of the cooling water flowing a cooling water path. An intake port 13 is provided on the intake side of the cylinder head 3, whereas an exhaust port 14 is provided on the exhaust side of the cylinder head 3.

An intake passage 15 is in communication with the intake port 13, whereas an exhaust passage 16 is in communication with the exhaust port 14. An intake valve 17 is disposed in the intake port 13 of the cylinder head 3, whereas an exhaust valve 18 is disposed in the exhaust port 14 of the cylinder head 3.

An intake side camshaft 19 is disposed above the intake valve 17 for drivingly opening/closing the intake valve 17. The exhaust side camshaft 20 is disposed above the exhaust valve 18 for drivingly opening/closing the exhaust valve 18.

An intake side timing pulley 21 is mounted at one end of the intake side camshaft 19, whereas an exhaust side timing pulley 22 is mounted at one end of the exhaust side camshaft 20. The timing pulleys 21, 22 are operably connected with the crankshaft 5 through a timing belt 23. Each camshaft 19, 20 rotates at a speed half the speed of the crankshaft 5.

In operation of the engine 1, a rotational torque of the crankshaft 5 is transmitted to the respective camshafts 19, 20 through the respective timing pulleys 21, 22 and the timing belt 23 for rotating the respective camshafts 19, 20.

Thus, the intake valve 17 and the exhaust valve 18 are drivingly opened/closed in synchronism with the rotation of the crankshaft 5 and the reciprocating movements of the piston 4.

Specifically, each valve 17, 18 is driven at a predetermined opening/closing timing in synchronism with a series of four strokes including an intake stroke, a compression stroke, an explosion (expansion) stroke and an exhaust stroke of the engine 1.

A cam angle sensor 24 is disposed in the vicinity of the intake side camshaft 19 for outputting a cam angle signal SGC which is used for detecting the operational timing (valve timing) of the intake valve 17.

A signal rotor 25 is formed integrally with the intake side camshaft 19, and has four teeth 25a of magnetic material formed at every rotational angle of 90° on the outer circumference thereof. The cam angle sensor 24 generates a pulse-like cam angle signal SGC every time each tooth 25a passes a front portion of the cam angle sensor 24.

A throttle valve 26 is disposed in the intake passage 15 and drivingly opened/closed by means of the movement of an accelerator pedal (not shown), thereby adjusting an air flow rate, i.e., an intake air amount Q supplied to the engine 1. A throttle sensor 27 is connected to the throttle valve 26 for detecting the opening degree of the throttle valve 26.

An intake pressure sensor 28 is disposed downstream of the throttle valve 26 for detecting an intake pressure Pb in that portion of the intake passage 15 which is disposed downstream of the throttle valve 26. A serge tank 29 is provided at a location downstream of the throttle valve 26 for controlling the pulsation of the intake air.

An injector 30 is disposed in the vicinity of the intake port 13 of each cylinder for injecting fuel thereto so as to feed an air/fuel mixture into the combustion chamber 8. Each injector 30 comprises an electromagnetic valve that is operated by a current supplied thereto. The fuel is delivered under pressure from a fuel pump (not shown) to each injector 30.

In operation of the engine 1, air is sucked into the intake passage 15 and at the same time, each injector 30 is operated to inject fuel toward a related intake port 13. As a result, an air/fuel mixture is formed in the intake port 13, and fed to the combustion chamber 8 upon opening of the intake valve 17 on the intake stroke.

A variable valve timing mechanism (hereinafter referred to as VVT) 40 is connected to the intake side camshaft 19 and driven by hydraulic oil (lubricant for the engine 1) for changing the valve opening and/or closing timing of the intake valve 17. Though not illustrated, a similar valve timing mechanism may also be connected to the exhaust side camshaft for changing the valve timing of the exhaust valve 18.

The VVT 40 continuously changes the valve timing of the intake valve 17 by changing a shift angle of the intake side camshaft 19 relative to the intake side timing pulley 21. An oil control valve (hereinafter referred to as OCV) 80 feeds the VVT 40 with the hydraulic oil and adjusts the amount of the hydraulic oil.

An electronic control unit (hereinafter referred to as ECU) 100 in the form of a microcomputer operates to drive various actuators such as the injector 30, igniter 11, OCV 80 and the like on the basis of the signals of the various sensors representative of the operating condition of the engine 1 (i.e., intake pressure Pb, throttle opening degree, cooling water temperature W, crank angle signal SGT, cam angle signal SGC or the like) and controls the fuel injection amount, the ignition timing, valve timing and the like relative to the engine 1.

The ECU 100 calculates mainly the rpm Ne of the engine on the basis of the crank angle signal SGT, obtains a volumetric efficiency EV of the intake air sucked into each cylinder as a fuel control parameter on the basis of the engine rpm Ne and the intake pressure Pb detected by and the intake pressure sensor 28, and calculates the amount of fuel injection from each ejector 30 on the basis of the volumetric efficiency EV.

Incidentally, the intake side camshaft 19, the exhaust side camshaft 20, the intake side timing pulley 21, the exhaust side timing pulley 22 and the timing belt 23 are provided on the camshafts 19 and 20 that are drivingly rotated in synchronism with the crank shaft 5 of the internal combustion engine and together constitute a valve opening/closing element for drivingly opening/closing the intake valve 17 and the exhaust valve 18 in synchronism with the rotation of the crank shaft 5. Also, the VVT 40 and the OCV 80 together constitute a rotational phase controller for shifting respective rotational phases of the camshafts 19 and 20 relative to the crank shaft 5.

Figure 2:
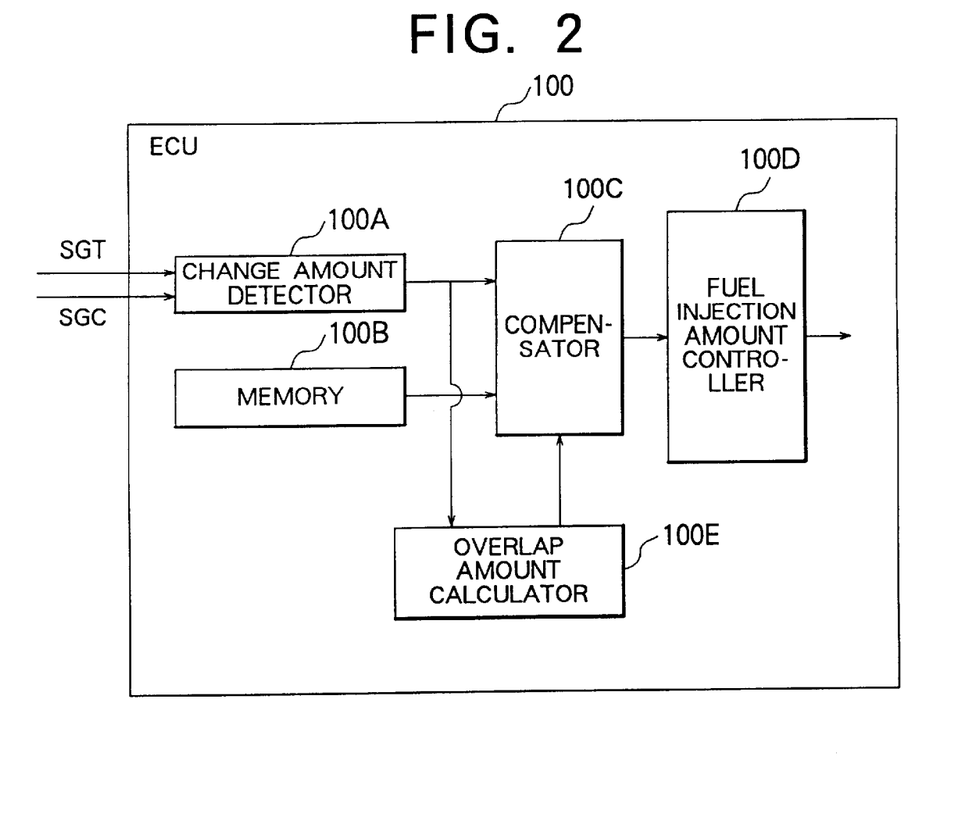
FIG. 2 is a functional block diagram of an electronic control unit (ECU) in accordance with a first embodiment of the present invention.

FIG. 2 is a block diagram showing the functional construction of the ECU 100 in the control apparatus for an internal combustion engine in accordance with the first embodiment of the present invention. As shown in FIG. 2, the ECU 100 is provided with a shift amount detector 100A for detecting the shift amount of the rotational phase relative to the crank shaft 5 by the rotational phase controller from the output signal SGT of the crank angle sensor 6 and the output signal SGC of the cam angle sensor 24, a memory 100B for storing the volumetric efficiency EV as the fuel control parameter at every shift amount out of the plurality of shift amounts (e.g., intake valve timing VT0 to VT4) as a plurality of data determined in advance on the basis of the rpm Ne of the engine and the intake pressure Pb, a compensator 100C for calculating the control data on the basis of the plurality of data of the volumetric efficiency EV stored in the memory 100B, the engine rpm Ne and the intake pressure Pb and compensating the calculated data on the basis of the detection values of the shift amount detector 100A, and a fuel injection amount controller 100D for controlling the fuel injection amount to each cylinder of the internal combustion engine in accordance with the data in which the volumetric efficiency EV has been compensated.

As will be described later, the volumetric efficiency EV used as the fuel control parameter has a maximum point at which a change in the change rate of the volumetric efficiency relative to a change amount of the intake valve opening timing becomes a maximum value. The data of the volumetric efficiency EV is determined in advance at a multitude of discrete change amounts of the valve timing (e.g., intake valve opening timing) in the vicinity of the maximum point in the change of the change rate.

Also, the ECU 100 is provided with an overlap amount calculator 100E for calculating an overlap amount of the exhaust valve on the basis of the detection value of the shift amount detector 100A, and the fuel control parameter is set at a value smaller at least in a region where the overlap amount is large than in the other regions.

Figure 3:
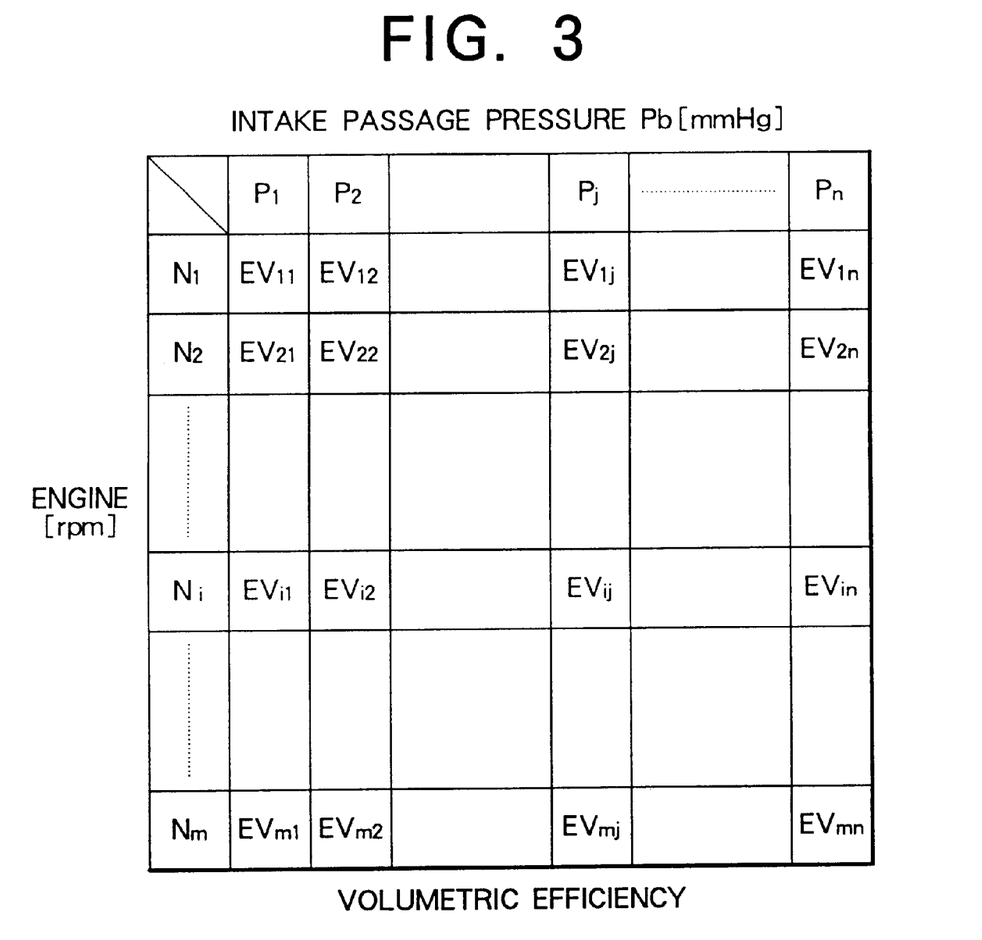
FIG. 3 is a map representing a relationship among an engine rpm, an intake pressure and a volumetric efficiency in accordance with the first embodiment of the present invention.

FIG. 3 is a map representing a relationship among the volumetric efficiency, the intake pressure and the rpm of the engine in accordance with the first embodiment of the present invention.

In FIG. 3, N1 to Nm represent m respective engine rpms Ne of the engine, P1 to Pn represent n intake pressures Pb (mmHg), and EV11 to EVmn designate m n volumetric efficiencies EV. The EVij represents a target (optimum) volumetric efficiency EV when the rpm Ne of the engine is Ni and the intake pressure Pb is Pj. This is obtained by experiments.

Figure 4:
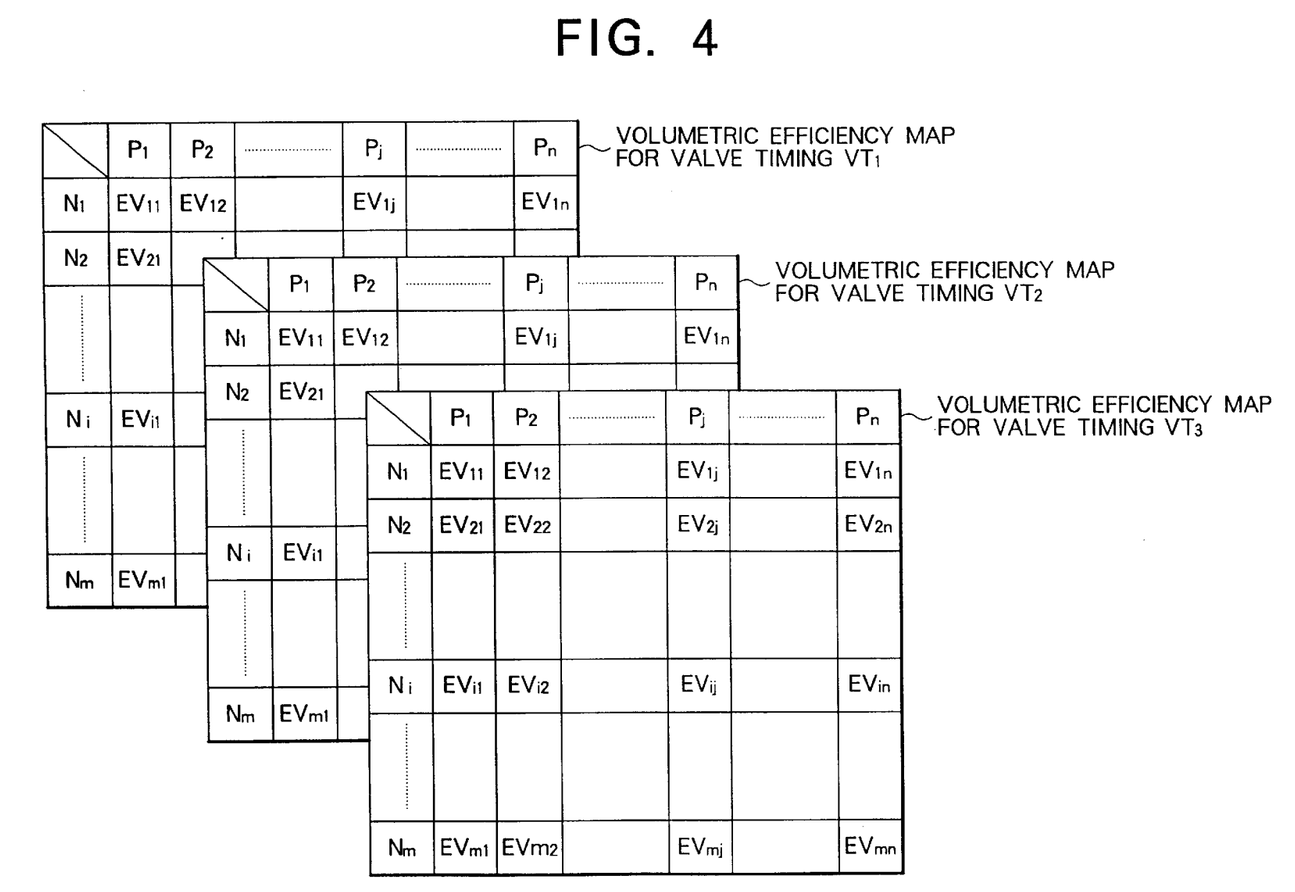
FIG. 4 is volumetric efficiency maps prepared for three valve opening/closing timings VT1, VT2 and VT3, respectively.

FIG. 4 shows volumetric efficiency maps formed, respectively, at three valve opening/closing timings VT1, VT2 and VT3, and these maps are stored in the memory 100B.

Figure 5:
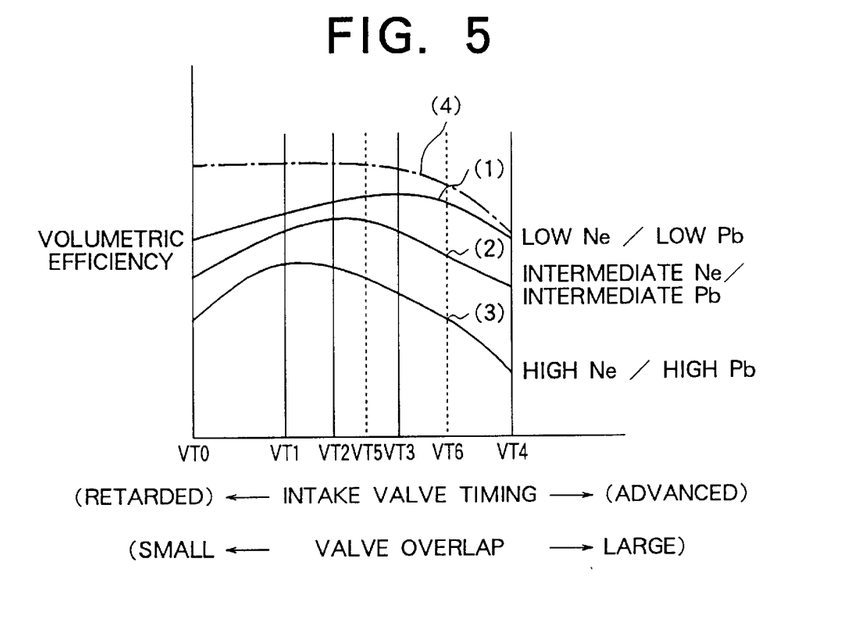
FIG. 5 is a graph showing a relationship between the volumetric efficiency and the intake valve opening/closing timing in the case where the rpm Ne of the engine and the intake pressure Pb are kept constant.

FIG. 5 shows a relationship between the volumetric efficiency EV and the intake valve opening/closing timing in the case where the rpm Ne of the engine and intake pressure Pb are made constant. In this figure, curve (1) represents the volumetric efficiency versus the intake valve opening/closing timing at a low rpm of the engine and a low intake pressure, curve (2) represents the volumetric efficiency versus the intake valve opening/closing timing at an intermediate rpm of the engine and an intermediate intake pressure, and curve (3) represents the volumetric efficiency versus the intake valve opening/closing timing at a high rpm of the engine and a high intake pressure.

As is apparent from FIG. 5, in the case where the rpm Ne of the engine and the intake pressure Pb are kept constant, as the intake valve opening/closing timing VT is changed from the position VT0 corresponding to the most retarded angle position in the variable range, in which the valve overlap period where the intake and exhaust valves are both closed is at minimum, to the position VT4 corresponding to the most advanced angle position in which the valve overlap period is at maximum, the volumetric efficiency EV increases substantially linearly until it reaches the maximum point and decreases substantially linearly from that position. In each of the volumetric efficiency/intake valve opening/closing timing curves (1) to (3), the points where the change in the change rate of the volumetric efficiency EV is at maximum are the change-rate change maximum points VT1 to VT3. In the illustrated example, the volumetric efficiency EV is changed from the substantially linear increment to the substantially linear decrement around each of the change-rate change maximum points VT1 to VT3. Such characteristics of the volumetric efficiency EV is derived from the fact that a so-called internal EGR amount of the air (i.e., the amount of air in the exhaust passage returned to the engine during the valve overlap period) is increased during the valve overlap period so that the amount of air to be sucked from the intake passage into the engine is decreased, or the fact that the pulsation of intake air occurs in accordance with the opening/closing operation of the intake/exhaust valves so that the amount of air sucked into the engine is increased in the case where the pulsation is synchronized with the opening/closing timing of the intake valve or the like. In the example shown in FIG. 5, with the high rpm of the engine and the high intake pressure, the peak (maximum value) of the volumetric efficiency EV appears when the intake valve opening/closing timing is at VT1 on the relatively retarded angle side; with the intermediate rpm and the intermediate intake pressure, the peak of the volumetric efficiency EV appears at VT2 when the intake valve opening/closing timing is on the more advanced angle side than VT1; and with the low rpm and the low intake pressure, the peak of the volumetric efficiency EV appears at VT3 when the intake valve opening/closing timing is on the more advanced angle side than VT2. For instance, there is a tendency that the peak of the volumetric efficiency EV, i.e., the change-rate change maximum point appears on the retarded angle side as the engine rpm and the intake pressure become higher, and that it appears on the advanced angle side as the engine rpm and the intake pressure become lower. In FIG. 5, the change-rate change maximum points VT1 to VT3 of the curves (1) to (3) indicated by the solid lines are points of inflection where the change rate of the volumetric efficiency EV is changed from positive to negative. Depending upon the engine rpm or the intake pressure, as shown by the one-dot-and-dash line in FIG. 5, there is a case where the curve of the volumetric efficiency EV monotonously decreases as the intake valve opening/closing timing moves toward the advanced angle side and there is no point of inflection where the change rate is changed from positive to negative. In such a case, the change-rate change maximum point VT6 is a point at which the change in the change rate becomes a maximum.

Incidentally, though not shown in FIG. 4, there are maps for the position VT0 where the intake valve opening/closing timing VT corresponds to the most retarded angle position in the variable range and for the position VT4 corresponding to the most advanced angle position in the variable range, and these maps are stored in the memory 100B in the same manner as at VT1 to VT3.

A method for compensating the volumetric efficiency EV using a plurality of volumetric efficiency maps according to the compensator 100C will now be described with reference to FIGS. 4 and 5.

First of all, the case where the intake valve opening/closing timing VT5 is to be determined will now be described. The compensator 100C first determines where VT5 exists in which one of the four regions VT0 to VT1, VT1 to VT2, VT2 to VT3 and VT3 to VT4. Then, the intake valve opening/closing timing on the retarded angle side and the advanced angle side close to VT5 is selected. In this case, as indicated by the dotted lines in FIG. 5, for the sake of the explanation, let us assume that VT5 is in a region between VT2 and VT3 and that the intake valve opening/closing timings near VT5 on the retarded angle side and the advanced angle side are VT2 and VT3, respectively. Then, the volumetric efficiency EV for VT5 is obtained by using (reading) the volumetric efficiency maps of the valve opening/closing timings VT2 and VT3 of FIG. 4 stored in the memory 100B. More specifically, the engine rpm Ne and the intake pressure Pj at the intake valve opening/closing timing VT5 will be obtained as follows.

First of all, the volumetric efficiency EVij(VT2) corresponding to Ni and Pj is obtained from the volumetric efficiency map of the opening/closing timing VT2, and at the same time, the volumetric efficiency EVij(VT3) corresponding to Ni and Pj is obtained from the volumetric efficiency map of the opening/closing timing VT3. Subsequently, EVij(VT5) is obtained from EVij(VT2) and EVij(VT3) in accordance with the interpolation calculation by using the following equation:

$$EVij(VT5)=EVij(VT2)+(EVij(VT3)-EVij(VT2))\cdot(VT5-VT2)/(VT3-VT2)$$

The fuel injection amount controller 100D obtains a target (optimum) fuel injection amount Qinj and a target injector drive time Tinj as indicated below by using the thus obtained volumetric efficiency EV. Namely, at the engine rpm Ne and the intake pressure Pj, the target (optimum) fuel injection amount Qinj is obtained from the following equation from the volumetric efficiency EVij(VT5) and the intake pressure Pj.

$$Qinj=Kq\cdot(Pj\cdot EVij(VT5))$$

where Kq is the fuel supply amount converting coefficient [mcc/mmHg] and Pj·EVij(VT5) corresponds to the intake air amount.

Actually, in addition, since there are a feedback compensation coefficient Kfb and a compensation coefficient Ketc for compensating the air density or the like, the target (optimum) fuel injection amount Qinj is:

$$Qinj=Kq\cdot(Pj\cdot EVij(VT5))\cdot Kfb\cdot Ketc$$

where the feedback compensation coefficient Kfb is detected by an oxygen sensor (not shown) by obtaining the oxygen concentration in the exhaust gas for feedback controlling the excess and deficit of the amount of fuel supplied or injected from the injector 30 as a result of the detection. According to such feedback control, it is possible to compensate for the offset due to the interpolation calculation of the above-described volumetric efficiency to some extent by the feedback compensation coefficient Kfb. However, if the offset is too large, it is impossible to compensate for the offset by the feedback compensation coefficient Kfb. Since the feedback compensation coefficient Kfb is used not only to compensate for the offset due to the interpolation calculation, it is preferable to keep the offset due to the interpolation calculation within about one fourth of the compensation range by the feedback compensation coefficient Kfb. Since the compensation range of the feedback compensation coefficient Kfb is usually about 20 to 30%, it is preferable to allow the offset of the compensation calculation within ±5 to ±7%.

The change-rate change maximum points VT1 to VT3 in curves (1) to (3) of the volumetric efficiency EV of FIG. 5 described above are the maximum points where the offset (deviation) exceeds 5% to 7% in the case where the curves (1) to (3) of the volumetric efficiency EV are approximated by the lines connecting both ends (VT0 and VT4) with each other. By re-approximating the values around the maximum points of the offset, it is possible to suppress the new offset less than or equal to the range of 5 to 7%.

Also, since the fuel supply is performed by the on/off control of the injector 30, the output value of the UCU for injector control becomes an injector drive time Tinj which is expressed as follows.

$$Tinj=Kinj\cdot Qinj$$

where Kinj is a conversion coefficient [msec/mcc] for converting an output amount Qinj of the injector 30 to the corresponding drive time Tinj.

The fuel injection amount controller 100D drives the injector 30 only for a period of the injector drive time Tinj so that the injector 30 injects the calculated amount of fuel Qinj into the intake passage 15 of each cylinder at a timing obtained from an output signal SGT of the crank angle sensor 6.

Incidentally, in the foregoing explanation, the fuel control parameter is the volumetric efficiency but instead of the volumetric efficiency, it is possible to use as the fuel control parameter the fuel injection amount or the injector drive time or the like thus obtained.

Embodiment 2

In embodiment 1, the present invention is applied to the case where the fuel injection amount is calculated in accordance with the volumetric efficiency. However, in embodiment 2, the present invention is applied to the case where the ignition timing of the internal combustion engine is calculated. In this case, ECU 200 obtains a target ignition period T for each cylinder as the ignition timing controlling parameter on the basis of the engine rpm Ne and the intake pressure Pb for optimally controlling the ignition timing of the ignition plug 9 provided for each cylinder while taking account of the engine operating condition.

Figure 6:
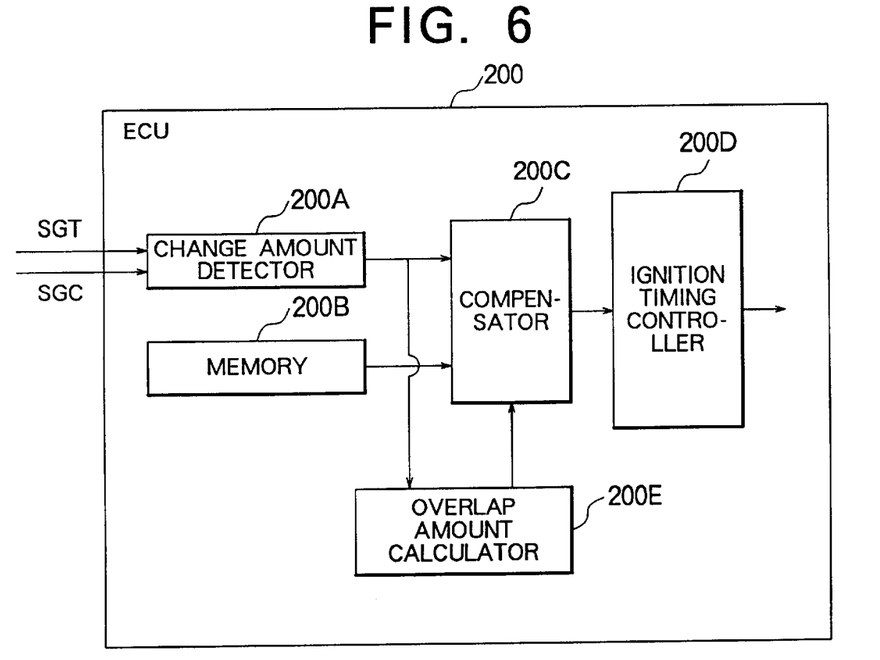
FIG. 6 is a functional block diagram showing an ECU in accordance with a second embodiment of the present invention.

FIG. 6 is a block diagram representing a function of the ECU 200 of the internal combustion engine control apparatus in accordance with the second embodiment. As shown in FIG. 6, the ECU 200 includes a shift amount detector 200A for detecting a shift amount of the rotational angle or phase of the camshaft 19 relative to the crank shaft 5 by a rotational phase controller from the output signal SGT of the crank angle sensor 6 and the output signal SGC of the cam sensor 24, a memory 200B for storing an ignition period T used as an ignition timing controlling parameter for each of a plurality of shift amounts (a plurality of intake valve timings VT0 to VT4) as a plurality of data obtained in advance on the basis of the intake pressure Pb and the engine rpm Ne, a compensator 200C for calculating the control data on the basis of the plurality of data of the ignition timing T stored in the memory 200B, the engine rpm Ne and the intake pressure Pb and compensating for the calculated data on the basis of the detection value of the shift amount detector 200A and an ignition timing controller 200C for controlling the ignition period of each cylinder of the internal combustion engine based on the compensated data of the ignition timing T.

The ignition timing T as the ignition timing controlling parameter has a change-rate change maximum point where the change in the change rate of the ignition angle or timing relative to the change amount of intake valve opening timing becomes the maximum. The data of the ignition timing T are obtained in advance for a multitude of discrete shift amounts of the valve timing (e.g., intake vale opening timing) close to the change-rate change maximum point.

Also, the ECU 200 is provided with an overlap amount calculator 200E for calculating an overlap amount of intake/exhaust valves on the basis of the detection value of the shift amount detector 200A. At least in a region where the overlap amount is large, the ignition timing controlling parameter is set to a value for more advancing the ignition timing than the other regions.

Figure 7:
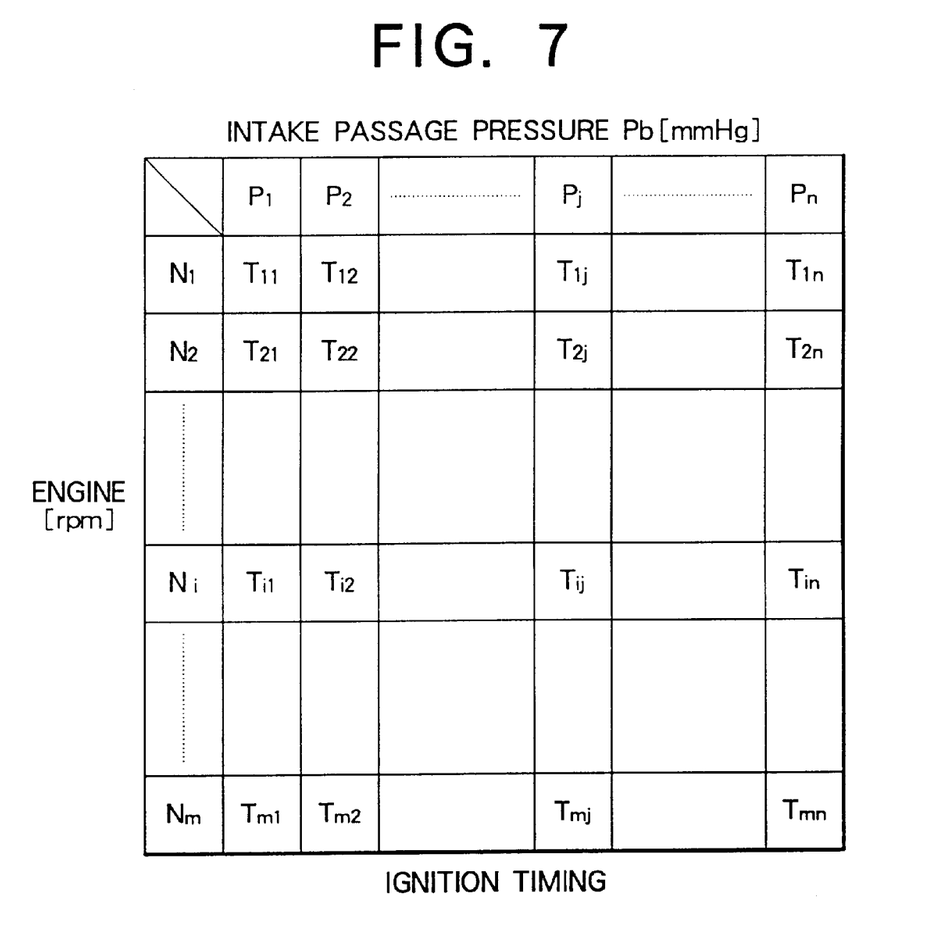
FIG. 7 is a map representing a relationship among an engine rpm, an intake pressure and an ignition timing in accordance with the second embodiment of the present invention.

FIG. 7 shows an ignition timing map in accordance with the second embodiment. This map represents the relationship among the engine rpm, the intake pressure and the ignition timing in some valve opening/closing timing.

In FIG. 7, the following parameters may be obtained by experiments. Specifically, N1 to Nm are m engine rpms Ne, P1 to Pn are n intake pressures Pb (mmHg), T11 to Tmn are m·n ignition timings, Tij is an optimum reference ignition timing (i.e., crank angle based on the top dead center on the compression stroke) when the engine rpm Ne is Ni and the intake pressure Pb is Pj.

Figure 8:
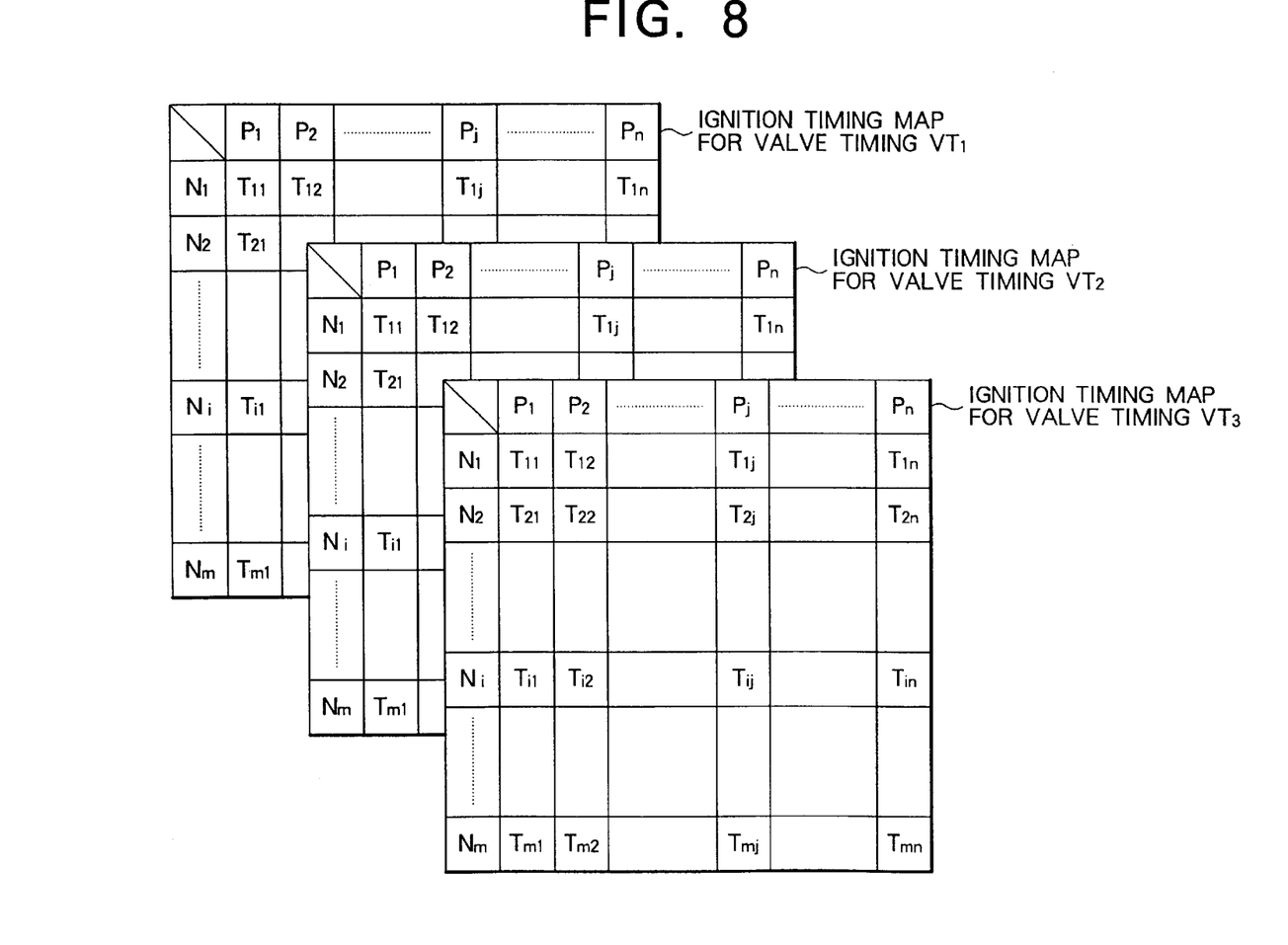
FIG. 8 is ignition timing maps prepared for three valve opening/closing timings VT1, VT2 and VT3, respectively.

FIG. 8 shows ignition timing maps prepared for three valve opening/closing timings VT1, VT2 and VT3, respectively. These maps are stored in the memory 200B.

Figure 9:
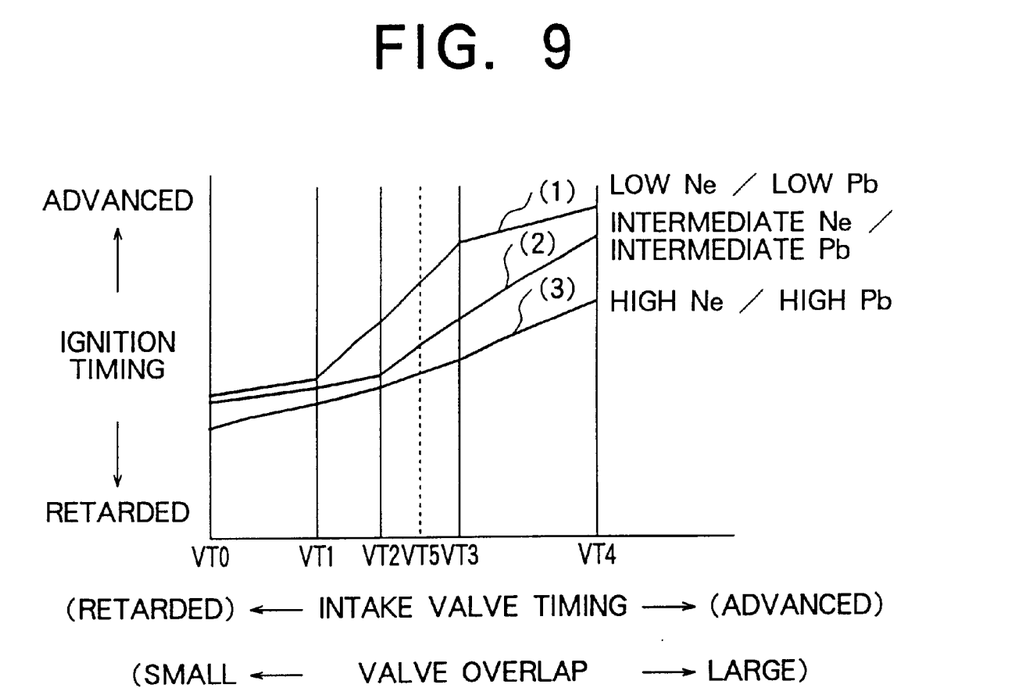
FIG. 9 is a graph showing a relationship between the ignition timing and the intake valve opening/closing timing in the case where the engine rpm Ne and the intake pressure Pb are kept constant.

FIG. 9 shows a relationship between the optimum ignition timing and the intake valve opening/closing timing in the case where the engine rpm Ne and the intake pressure Pb are kept constant. Curve (1) represents the ignition timing versus the intake valve opening/closing timing at a low engine rpm and at a low intake pressure; curve (2) represents the ignition timing versus the intake valve opening/closing timing at an intermediate engine rpm and at an intermediate intake pressure; and curve (3) represents the ignition timing versus the intake valve opening/closing timing at a high engine rpm and at a high intake pressure, respectively.

Also, in the second embodiment, the compensator 200C obtains an optimum ignition timing T in any intake valve opening/closing timing VT in the same manner as in the first embodiment in accordance with the interpolation calculation from two ignition timing maps in the intake valve opening/ timings close to the optimum ignition timing T on the retarded angle side and the advanced angle side, respectively. The specific calculation method of this ignition timing T is exactly the same as the calculation method of the volumetric efficiency according to the first embodiment. Specifically, the volumetric efficiency EV of the first embodiment is merely replaced by the ignition timing T. Therefore the detailed explanation thereof will be omitted.

Then, the ignition timing controller 200D obtains a target ignition timing adv from a target basic ignition timing b and a various control compensation term etc on the basis of the thus obtained ignition timing T, as expressed below:

$$adv=b+etc$$

where the compensation term etc includes a retarded angle of the ignition timing for preventing the generation of knock at the vehicle starting, an advanced angle or a retarded angle for advancing or retarding the target ignition timing in response to the operating condition of the vehicle, another retarded angle for preventing the generation of knocking which would be likely to occur depending upon the amount of intake air, and so on.

The ignition timing controller 200D generates a high tension voltage by the igniter 11 at the target ignition timing adv thus calculated, which is applied to the ignition plug 9 of each cylinder through the distributor 10 to generate a spark, thus igniting the air/fuel mixture supplied from the injector 30 to the combustion chamber 8 of each cylinder through the intake port 13 during the opening period of the intake valve 17.

Incidentally, in the foregoing explanation, the ignition timing T as the ignition timing controlling parameter is the crank angle measured with the top dead center of the compression stroke being a reference position. However, instead of the crank angle, it is possible to use as the ignition timing controlling parameter the ignition timing represented by the time from the reference position.

Also, in the above-described first and second embodiments, the hydraulic drive type (hydraulically operated) controlling mechanism is used as the valve timing variable mechanism. It is, however, possible to use an electric type or a mechanical type controlling mechanism. If it is possible to change the rotational angle or phase between the camshaft and the crank angle, any type of mechanism may be used for the implementation of the present invention.

As described above, according to one aspect of the present invention, a control apparatus for an internal combustion engine is provided for variably controlling an opening/closing timing of an intake valve and an exhaust valve of the internal combustion engine in response to an engine operational condition. The apparatus includes: a memory for storing a fuel control parameter as a plurality of data preset on the basis of an intake pressure and an rpm of the internal combustion engine; a valve opening/closing element provided on a camshaft which is operably connected with a crank shaft of the internal combustion engine for opening/closing the intake valve and the exhaust valve in synchronism with a rotation of the crank shaft; a rotational phase controller for shifting a rotational phase of the camshaft relative to the crank shaft; a shift amount detector for detecting a shift amount of the rotational phase of the camshaft relative to the crank shaft caused by the rotational phase controller; a compensator for calculating control data on the basis of the intake pressure, the rpm of the engine and the plurality of data of the fuel control parameter stored in the memory and for compensating the calculated data on the basis of the detection value of the shift amount detector; and a fuel injection amount controller for controlling a fuel injection amount to each cylinder of the internal combustion engine in accordance with data in which the fuel control parameter has been compensated for. The fuel control parameter has a change-rate change maximum point at which a change in a change rate of the fuel control parameter relative to the shift amount of the camshaft is at maximum, and the data of the fuel control parameter is determined in advance for each shift amount substantially corresponding to the change rate change maximum point.

With this construction, it is possible to exactly obtain the fuel control parameter corresponding to the shift amount of the camshaft even if the opening/closing timing of the exhaust valve or the intake valve is changed, so that the fuel injection amount to each cylinder may be exactly controlled.

Also, since values of the fuel control parameter other than the stored data are obtained through an interpolation calculation in response to a detection value of the shift amount detector from the fuel control parameter stored corresponding to the shift amount close to the detection value, it is possible to reduce the data to be held or stored in the memory as much as possible.

Furthermore, according to another aspect of the present invention, a control apparatus for an internal combustion engine is provided for variably controlling an opening/closing timing of an intake valve and an exhaust valve of the internal combustion engine in response to an engine operational condition. The apparatus comprises: a memory for storing an ignition timing control parameter as a plurality of data preset on the basis of an intake pressure and an rpm of the internal combustion engine; a valve opening/closing element provided on a camshaft which is operably connected with a crank shaft of the internal combustion engine for drivingly opening/closing the intake valve and the exhaust valve in synchronism with a rotation of the crank shaft; rotational phase controller for shifting a rotational phase of the camshaft relative to the crank shaft; a shift amount detector for detecting a shift amount of the rotational phase of the camshaft relative to the crank shaft caused by the rotational phase controller; a compensator for calculating control data on the basis of the intake pressure, the rpm of the engine and the plurality of data of the ignition timing control parameter stored in the memory and for compensating the calculated data on the basis of the detection value of the shift amount detector; and an ignition timing controller for controlling an ignition timing for each cylinder of the internal combustion engine according to data in which the ignition timing control parameter has been compensated for. The ignition timing control parameter has a change-rate change maximum point at which a change in a change rate of the ignition timing control parameter relative to the shift amount of the camshaft is at maximum, and the data of the ignition timing control parameter is determined in advance for each shift amount substantially corresponding to the change-rate change maximum point.

With this construction, it is possible to exactly obtain the ignition timing control parameter corresponding to the shift amount of the camshaft even if the opening/closing timing of the exhaust valve or the intake valve is changed, so that the fuel injection amount to each cylinder may be exactly controlled.

Furthermore, since values of the ignition timing control parameter other than the stored data are obtained through an interpolation calculation in response to a detection value of the shift amount detector from the ignition timing control parameter stored corresponding to the shift amount close to the detection value, it is possible to reduce the data to be held or stored in the memory as much as possible.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A control apparatus f or an internal combustion engine for variably controlling an opening/closing timing of an intake valve and an exhaust valve of the internal combustion engine in response to an engine operating condition, the apparatus comprising:

a memory for storing an ignition timing control parameter as a plurality of data preset on the basis of an intake pressure and an rpm of the internal combustion engine;

a valve opening/closing element provided on a camshaft which is operably connected with a crank shaft of the internal combustion engine for drivingly opening/closing the intake valve and the exhaust valve in synchronism with a rotation of the crank shaft;

a rotational phase controller for shifting a rotational phase of the camshaft relative to the crank shaft;

a shift amount detector for detecting a shift amount of the rotational phase of the camshaft relative to the crank shaft caused by the rotation shift controller;

a compensator for calculating control data on the basis of the intake pressure, the rpm of the engine and the plurality of data of the ignition timing control parameter stored in the memory and for compensating the calculated data on the basis of the detection value of the shift amount detector; and an ignition timing controller for controlling an ignition timing for each cylinder of the internal combustion engine in accordance with data in which the ignition timing control parameter has been compensated for;

wherein the ignition timing control parameter has a change-rate change maximum point at which a change in a change rate of the ignition control parameter relative to the shift amount of the camshaft is at maximum, and the data of the ignition timing control parameter is determined in advance for each shift amount substantially corresponding to the change-rate change maximum point.

2. The control apparatus for an internal combustion engine according to claim 1, wherein values of the ignition timing control parameter other than the stored data are obtained through an interpolation calculation in response to a detection value of the shift amount detector from the stored ignition timing control parameter corresponding to the shift amount close to the detection value.

3. The control apparatus for a internal combustion engine according to claim 4, further comprising an overlap amount calculator for calculating an overlap amount of the intake valve and the exhaust valve on the basis of the detection value of the shift amount detector, wherein the ignition timing control parameter is a value that advances the ignition timing at least in a region where the overlap amount is greater than a predetermined value than that in the other regions thereof.

* * * * *

UNITED STATES PATENT AND TRADEMARK OFFICE
CERTIFICATE OF CORRECTION

PATENT NO.     : 6,325,047 B2
DATED          : December 4, 2001
INVENTOR(S)    : Takeshi Kawakami It is certified that error appears in the above-identified patent and that said Letters Patent is hereby corrected as shown below:

Column 14,
Line 32, please delete "claim 4" and insert -- claim 1 --.

Signed and Sealed this

Third Day of December, 2002

JAMES E. ROGAN
*Director of the United States Patent and Trademark Office*